(12) United States Patent
Durand et al.

(10) Patent No.: US 8,006,432 B2
(45) Date of Patent: Aug. 30, 2011

(54) DEVICE FOR TRAPPING FLYING INSECTS

(75) Inventors: Emma Amelia Durand, Jamestown, RI (US); Michael J. Palombo, Warwick, RI (US); Richard B. Dunne, Jamestown, RI (US)

(73) Assignee: Woodstream Corporation, Lititz, PA (US)

( * ) Notice: Subject to any disclaimer, the term of this patent is extended or adjusted under 35 U.S.C. 154(b) by 9 days.

(21) Appl. No.: 12/591,125

(22) Filed: Nov. 9, 2009

(65) Prior Publication Data

US 2010/0132248 A1    Jun. 3, 2010

Related U.S. Application Data

(63) Continuation of application No. 11/907,624, filed on Oct. 15, 2007, now Pat. No. 7,614,180.

(51) Int. Cl.
*A01M 1/08* (2006.01)

(52) U.S. Cl. ......................................................... 43/139

(58) Field of Classification Search .................... 43/139, 43/107
See application file for complete search history.

(56) References Cited

U.S. PATENT DOCUMENTS

| | | | | |
|---|---|---|---|---|
| 4,324,062 A * | 4/1982 | Schneider | ...................... | 43/110 |
| 5,669,176 A * | 9/1997 | Miller | ............................. | 43/139 |
| 5,813,166 A * | 9/1998 | Wigton et al. | ................. | 43/107 |
| 6,145,243 A * | 11/2000 | Wigton et al. | ................. | 43/139 |
| 6,286,249 B1 * | 9/2001 | Miller et al. | ................... | 43/139 |
| 6,655,080 B2 * | 12/2003 | Spiro et al. | ..................... | 43/139 |
| 6,662,489 B2 * | 12/2003 | Spiro et al. | ..................... | 43/107 |
| 6,718,685 B2 * | 4/2004 | Bossler | ........................... | 43/107 |
| 6,817,140 B1 * | 11/2004 | Durand et al. | ................. | 43/139 |
| 6,840,005 B2 * | 1/2005 | Durand et al. | ................. | 43/139 |
| 6,892,492 B2 * | 5/2005 | Durand et al. | ................. | 43/139 |
| 6,925,752 B1 * | 8/2005 | Cherry et al. | .................. | 43/139 |
| 7,281,351 B2 * | 10/2007 | Durand et al. | ................. | 43/139 |
| 2004/0237382 A1 * | 12/2004 | Durand et al. | ................. | 43/139 |
| 2007/0017150 A1 * | 1/2007 | Ohno et al. | ..................... | 43/139 |
| 2008/0134570 A1 * | 6/2008 | Durand et al. | ................. | 43/139 |
| 2010/0037512 A1 * | 2/2010 | Durand | ........................... | 43/139 |

* cited by examiner

*Primary Examiner* — Christopher P Ellis
(74) *Attorney, Agent, or Firm* — Jacobson Holman PLLC

(57) ABSTRACT

A flying insect trapping device configured to be used with a fuel supply containing a combustible fuel is disclosed. The trapping device includes a combustion device that includes an inlet port for receiving the combustible fuel, a turbulence reducing structure for substantially laminating flow of a mixture of the combustible fuel and air, a catalyst element disposed downstream of the turbulence reducing structure, a heat zone having a hollow interior space in between the turbulence reducing structure and the catalyst element to enable the combustible fuel to flow into the heat zone for continuous combustion therein to create an exhaust gas comprising carbon dioxide, and a plurality of heat exchanger fins extending inwardly into the hollow interior space of the heat zone for conducting heat generated by the continuous combustion.

20 Claims, 12 Drawing Sheets

US 8,006,432 B2

DEVICE FOR TRAPPING FLYING INSECTS

CROSS-REFERENCE TO RELATED APPLICATIONS

This application is a continuation of copending application Ser. No. 11/907,624, filed on Oct. 15, 2007, now U.S. Pat. No. 7,614,180 which claims the benefit of priority from application Ser. No. 11/083,090, filed Mar. 18, 2005 and issuing as U.S. Pat. No. 7,281,351 on Oct. 16, 2007, which claims the benefit of priority from United States Provisional Patent Application No. 60/554,409, filed Mar. 19, 2004, the entire contents of which are incorporated herein by reference.

BACKGROUND OF THE INVENTION

1. Field of the Invention

The present invention relates to a device for trapping flying insects such as mosquitoes, no-see-ums, and other insects.

2. Description of Related Art

U.S. Pat. Nos. 6,145,243 ("the '243 patent") and 6,840,005 ("the '005 patent) disclose insect trapping devices developed by the assignee of the present application, American Biophysics Corp. of North Kingstown, R.I. The '243 patent and the '005 patent disclose devices that use combustion to generate a flow of carbon dioxide for attracting mosquitoes and other flying insects towards the devices. In each device, a vacuum draws the insects attracted by the carbon dioxide through an inlet and into a trap chamber. The trap chamber includes a disposable mesh bag in which the mosquitoes become dehydrated. When the bag becomes full, it can be removed and replaced.

While the devices disclosed in the '243 patent and the '005 patent have been commercially successful for American Biophysics Corporation, further product development efforts by the inventors of the present application have yielded a number of improvements that are directed to improving the devices.

SUMMARY OF THE INVENTION

One aspect of the invention provides a flying insect trapping device configured to be used with a fuel supply containing a combustible fuel. The trapping device comprises a supporting frame, an insect inlet configured to receive flying insects, an insect trap chamber communicated to the insect inlet, and configured to receive the flying insects from the insect inlet, and a combustion device. The combustion device comprises an inlet port for receiving the combustible fuel, a turbulence reducing structure for substantially laminating flow of a mixture of the combustible fuel and air, a catalyst element disposed downstream of the turbulence reducing structure, a heat zone having a hollow interior space in between the turbulence reducing structure and the catalyst element to enable the combustible fuel to flow into the heat zone for continuous combustion therein to create an exhaust gas comprising carbon dioxide, and a plurality of heat exchanger fins extending inwardly into the hollow interior space of the heat zone for conducting heat generated by the continuous combustion. The trapping device also includes an exhaust outlet configured to receive the exhaust gas and allow the exhaust gas to flow outwardly therethrough so that insects attracted to the carbon dioxide in the exhaust gas will fly towards the trapping device. An electrically powered vacuum device is communicated to the insect inlet and constructed to draw the insects attracted to the trapping device into the insect trap chamber via the insect inlet. The trapping device further includes a heat sink configured to dissipate heat, and a thermoelectric device for generating electric current as heat transfers from a first side thereof to a second side thereof. The thermoelectric device has the first side disposed in contact with the combustion device and the second side disposed in contact with the heat sink to enable heat generated by the continuous combustion, including heat conducted by the fins, to be transferred to the heat sink via the thermoelectric device to generate the electric current. The thermoelectric device is electrically coupled to at least the vacuum device to power the vacuum device.

Another aspect of the invention provides an insect trapping device that is configured to be used with a fuel supply containing a combustible fuel. The trapping device comprises a supporting frame comprising a housing having a lower housing part and an upper housing part. The upper housing part is movably connected to the lower housing part for movement between open and closed positions. The trapping device also includes an insect inlet configured to receive flying insects, and an insect trap chamber removably mounted on the lower housing part, and configured to receive the flying insects from the insect inlet. The insect trap chamber is accessible and removable when the upper housing part is in the open position and is covered by the upper housing part when the upper housing part is in the closed position. A combustion device is mounted on the lower housing part. The combustion device is configured to provide an interior space for continuous combustion of the combustible fuel therein to create an exhaust gas comprising carbon dioxide. An exhaust outlet is configured to receive the exhaust gas and allow the exhaust gas to flow outwardly therethrough so that insects attracted to the carbon dioxide in the exhaust gas will fly towards the trapping device. The trapping device further includes a vacuum device communicated to the insect inlet and constructed to draw the insects attracted to the trapping device into the insect trap chamber via the insect inlet, and a supporting member movable between (a) a supporting position supporting the upper housing part in the open position, and (b) an inoperative position allowing the upper housing part to move to the closed position.

Another aspect of the invention provides a flying insect trapping device configured to be used with a fuel supply containing a combustible fuel. The trapping device comprises a supporting frame, an insect inlet configured to receive flying insects, an insect trap chamber configured to receive the flying insects from the insect inlet, and a combustion device configured to provide an interior space for continuous combustion of the combustible fuel therein to create an exhaust gas comprising carbon dioxide. The trapping device also includes an exhaust outlet configured to receive the exhaust gas and allow the exhaust gas to flow outwardly therethrough so that insects attracted to the carbon dioxide in the exhaust gas will fly towards the trapping device. An electrically powered vacuum device is communicated to the insect inlet and constructed to draw the insects attracted to the trapping device into the insect trap chamber via the insect inlet. A heat sink is configured to dissipate heat, and a thermoelectric device generates electric current as heat transfers from a first side thereof to a second side thereof. The thermoelectric device has the first side disposed in contact with the combustion device and the second side disposed in contact with the heat sink to enable heat generated by the continuous combustion to be transferred to the heat sink via the thermoelectric device to generate the electric current. The thermoelectric device is electrically coupled to at least the vacuum device to power the vacuum device. The trapping device further includes a clamping device for pressing the combustion device against the thermoelectric device to substantially evenly distribute the heat being conducted from the combustion device across the first side of the thermoelectric device. The clamping device is connected to the heat sink and is configured to apply a single point of contact to the combustion device, the single point of contact being substantially aligned with a center of the first side of the thermoelectric device.

Another aspect of the present invention provides a flying insect trapping device configured to be used with a fuel supply containing a combustible fuel. The trapping device comprises a supporting frame, an insect inlet configured to receive flying insects, an insect trap chamber configured to receive the flying insects from the insect inlet, a combustion device configured to provide an interior space for continuous combustion of the combustible fuel therein to create an exhaust gas comprising carbon dioxide, and an exhaust outlet configured to receive the exhaust gas and allow the exhaust gas to flow outwardly therethrough so that insects attracted to the carbon dioxide in the exhaust gas will fly towards the trapping device. A vacuum device is communicated to the insect inlet and constructed to draw insects attracted to the trapping device into the insect trap chamber via the insect inlet, and an insect attractant receptacle is disposed in fluid communication between the combustion device and the exhaust outlet. The attractant receptacle is configured to receive a diffusible insect attractant that diffuses into the exhaust gas before the exhaust gas exits the trapping device via the exhaust outlet. The insect attractant receptacle includes an opening for enabling the insect attractant to be removed and replaced, and a cover removably covering the opening. The cover is removable to allow access to the attractant in the attractant receptacle.

BRIEF DESCRIPTION OF THE DRAWINGS

Embodiments of the invention will now be described, by way of example only, with reference to the accompanying drawings in which corresponding reference symbols indicate corresponding part, and in which.

DETAILED DESCRIPTION OF ILLUSTRATED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
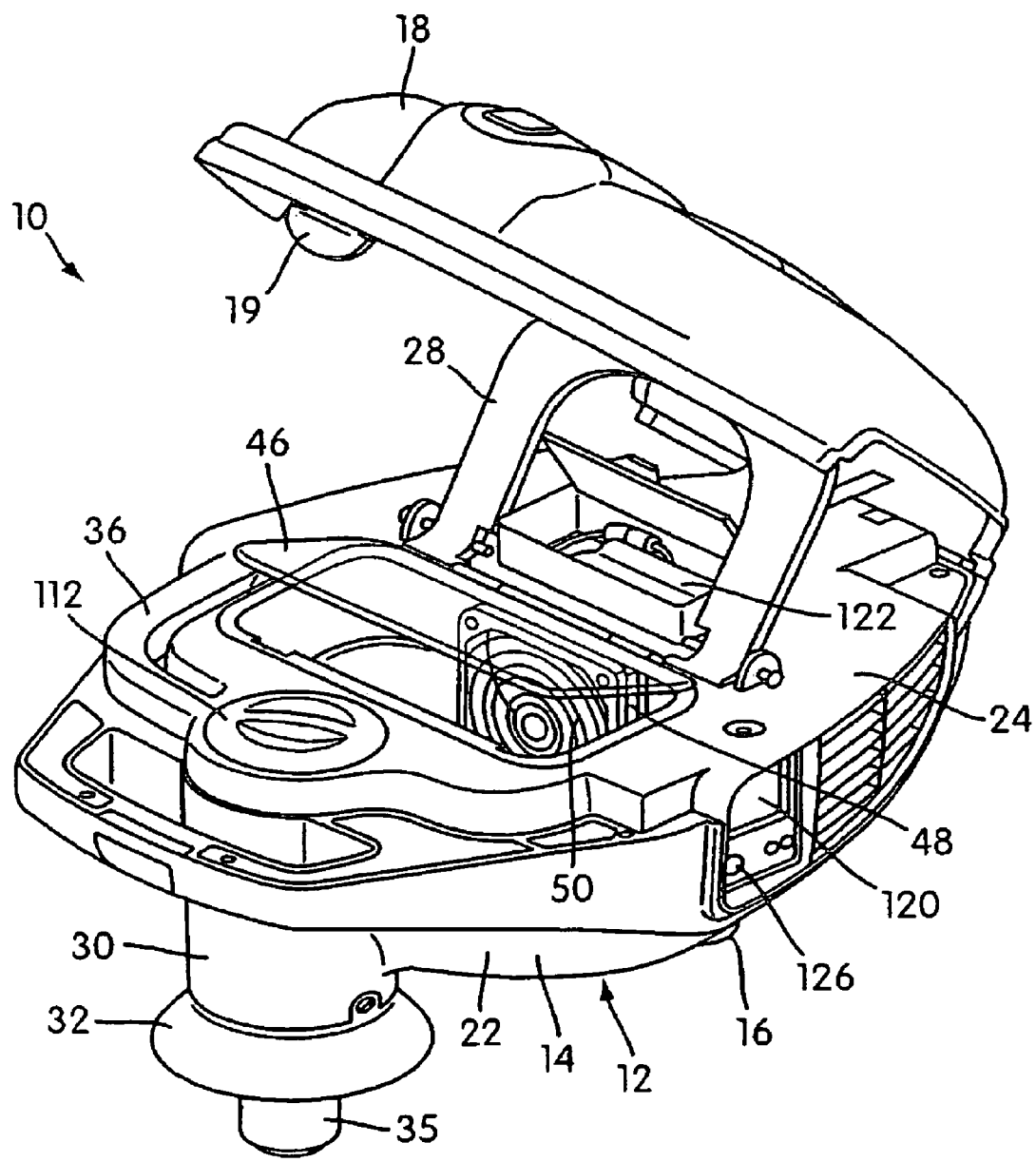
FIG. 1 is a top perspective view of a flying insect trapping device constructed in accordance with an embodiment of the invention.

FIG. 1 illustrates a flying insect trapping device 10 constructed according to an embodiment of the present invention. The device 10 is designed to be used with a supply of combustible fuel, such as a propane tank of the type conventionally used by consumers for supplying fuel to a barbeque grill. As will be discussed in greater detail below, the device 10 generates a supply of $CO_2$ gas and water vapor, which is released as an insect attractant, and is also configured to generate all the electrical power it needs to operate.

Broadly speaking, the general function of the device 10 is to emit an outflow comprising an insect attractant, i.e., $CO_2$ gas, for attracting mosquitoes and/or other flesh biting insects. Then, an inflow draws the attracted insects into a trap chamber within the device 10, whereat the insects are captured and may be killed by poison or dehydration/starvation. Alternatively, a user engaged in the study of insects may opt to not kill the captured insects and instead may remove them from the device 10 prior to dying for purposes of live examination. Regardless of the specific insect capturing purpose the user has in mind, the overall function of the device 10 is to attract and capture flying insects. The specifics of how the present invention operates to achieve this broad general function is discussed herein below.

Figure 2:
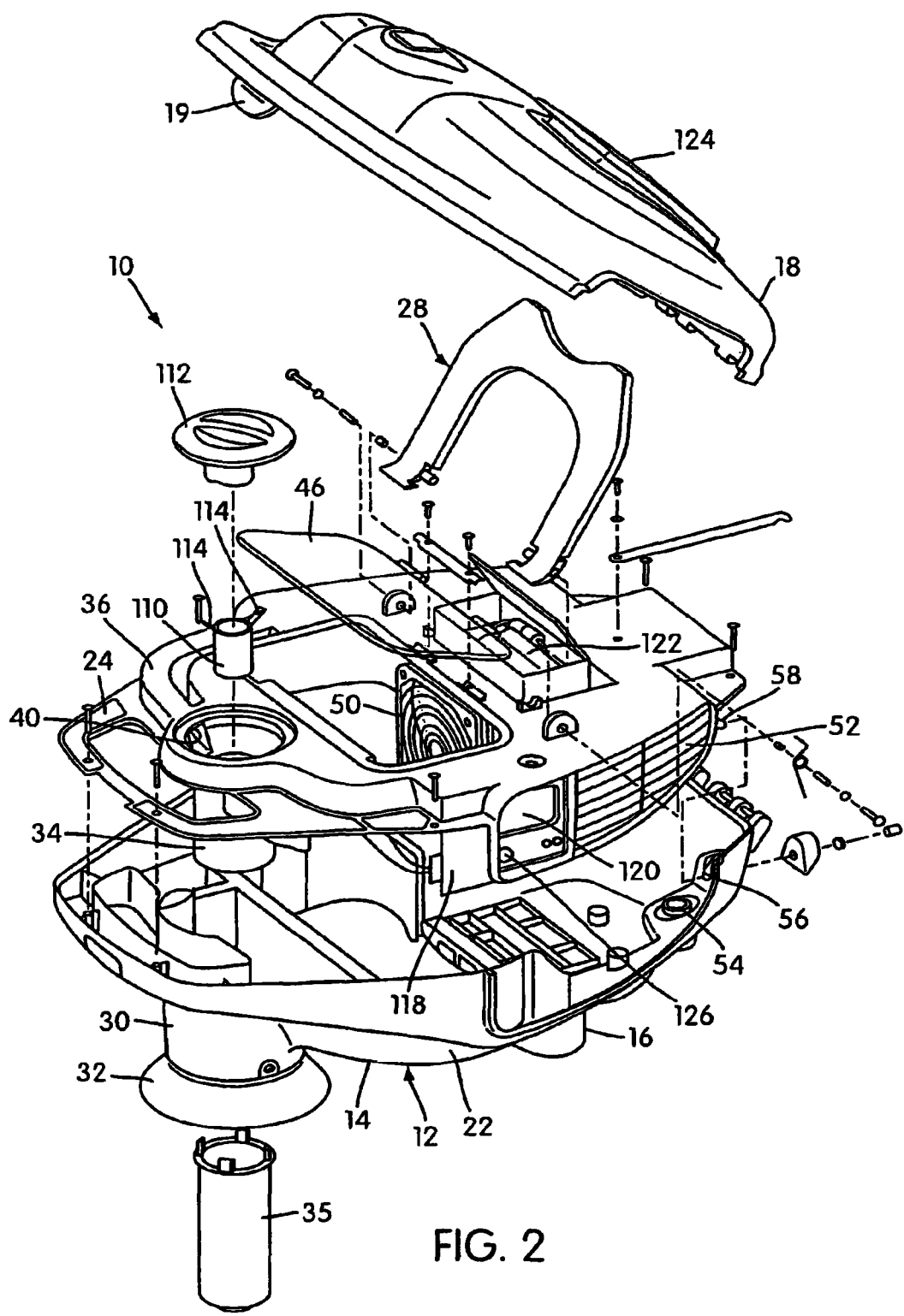
FIG. 2 is an exploded view, from the top, of the flying insect trapping device shown in FIG. 1.
Figure 3:
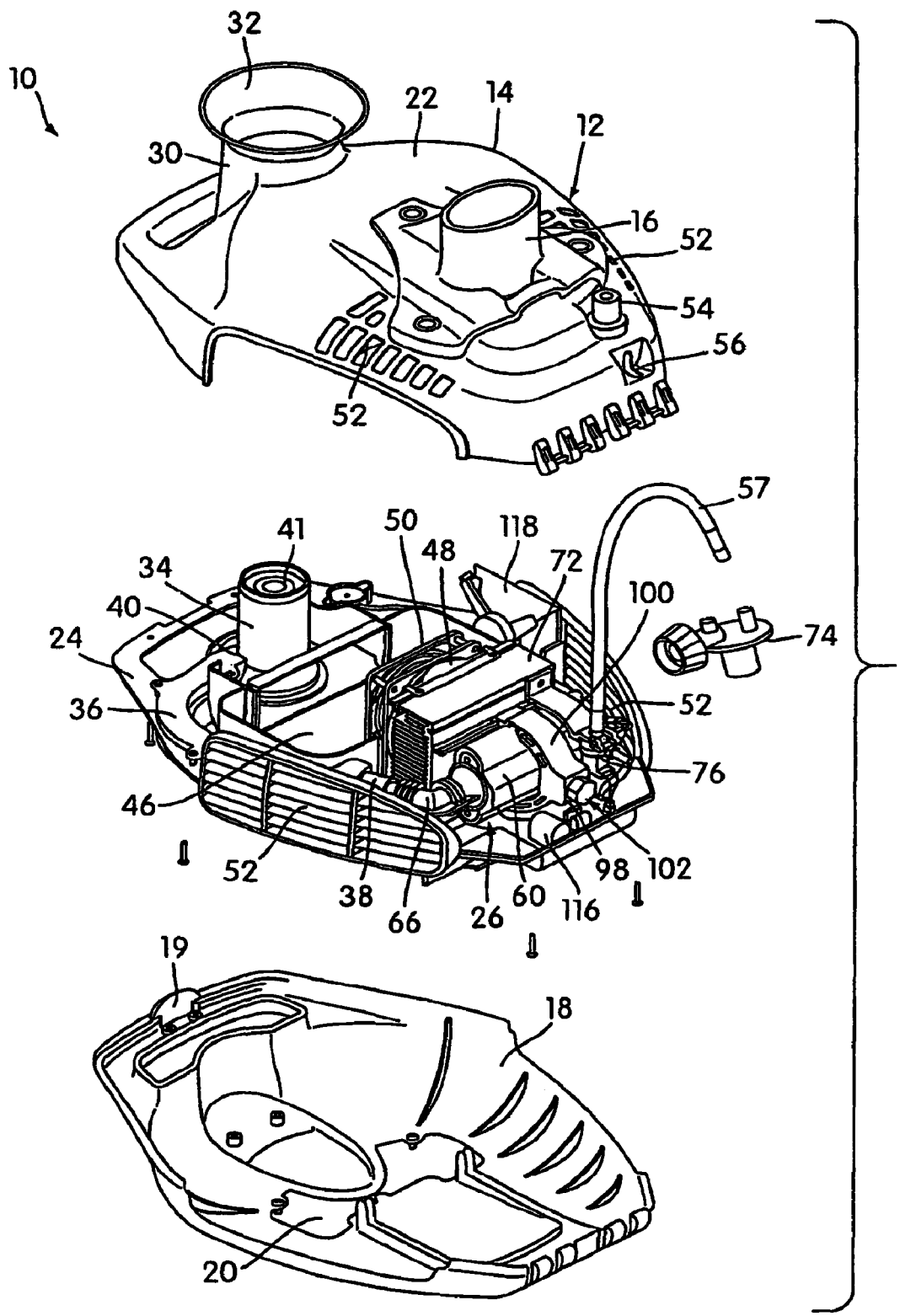
FIG. 3 is an exploded view, from the bottom, of the flying insect trapping device shown in FIG. 1.

As shown in FIGS. 1-3, the device 10 comprises a supporting frame 12. The supporting frame 12 includes a housing 14 that provides a mounting structure 16, e.g., a tubular support. The supporting frame 12 may include one or more legs that can be operatively engaged with the mounting structure 16 on the housing 14 for supporting the housing 14 in an elevated position from the ground. The supporting frame 12, however, may have any construction or configuration suitable for carrying the operative components discussed herein below, for example a tripod arrangement may also be used. Additionally, the frame 12 may include wheels, as shown in the aforementioned '243 patent and '005 patent, the entirety of each of which is hereby incorporated into the present application by reference. Alternatively, instead of using legs, the frame 12 may include a bracket (not shown) for mounting the device 10 to the interior or exterior wall of a building, a fence, etc., or a hanger (not shown) for suspending the device 10 from a post or ceiling. Further, the supporting frame 12 may also include a supporting deck for carrying the propane tank, so that the tank and device 10 can be transported together as a unit, as is also shown in the '243 patent.

Figure 5:
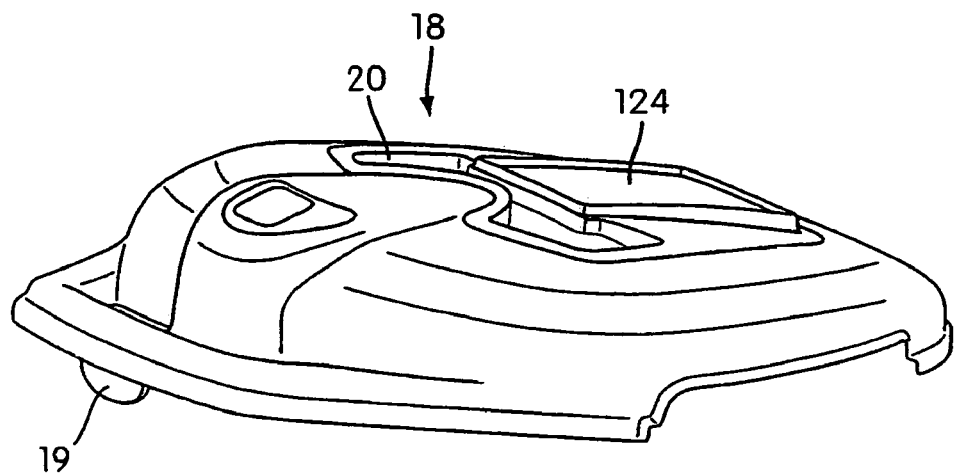
FIG. 5 is a top perspective view of an upper shell of the flying insect trapping device shown in FIG. 1.
Figure 6:
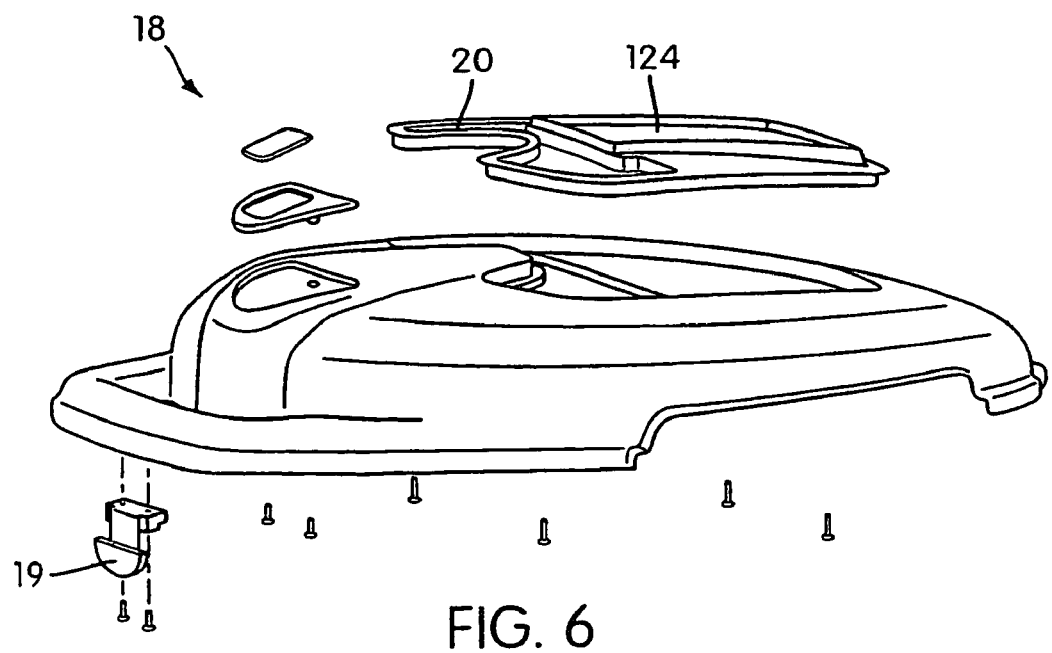
FIG. 6 is an exploded view of the upper shell shown in FIG. 5.

The housing 14 includes an upper shell 18, or portion, (which may include an opaque, translucent, or transparent portion 20) that is pivotally mounted to a lower shell 22, or portion, for pivotal movement between open and closed positions. In the open position, access to the interior of the housing 14 is permitted. The shells 18, 22 may be locked in a closed position. In the illustrated embodiment, the upper shell 18 includes a movable lock member 19 (e.g., see FIGS. 5 and 6) that is releasably received within a recess provided in the lower shell 22 so as to lock the upper shell 18 in the closed position. Also, the upper and lower shells 18, 22 each include an elongated recess that cooperate, when in the closed position, to provide a handle for carrying purposes.

In the illustrated embodiment, the shells 18, 22 are molded from plastic. Additionally, the shells 18, 22 each have hinge portions molded in one piece therewith. The hinge portions interlock with one another to provide the pivotal movement. However, the housing 14 in general may be made from any material and may take any shape, configuration, or construction.

As shown in FIG. 1-3, a tubular intake nozzle 30 protrudes downwardly from the bottom of lower shell 22 and is formed integrally therewith. The intake nozzle 30 has a flared lower end 32, which is attached by fasteners or snap-fitting to, and thus forms a part of, the intake nozzle 30. The flared lower end 32 defines an insect inlet opening that opens to the surrounding atmosphere. As will be appreciated from the details provided below, a vacuum is applied to the intake nozzle 30 and the insects attracted to the insect attractant emanated by the device 10 will be drawn into the insect inlet opening for capture. The intake nozzle 30 and the inlet opening provided thereby may be carried on the frame 12 in any suitable matter and the construction illustrated and described is only an exemplary construction. Thus, other constructions or configurations may be used. For example, multiple insect inlet openings, and/or openings with other locations, shapes or orientations may be used.

Figure 4:
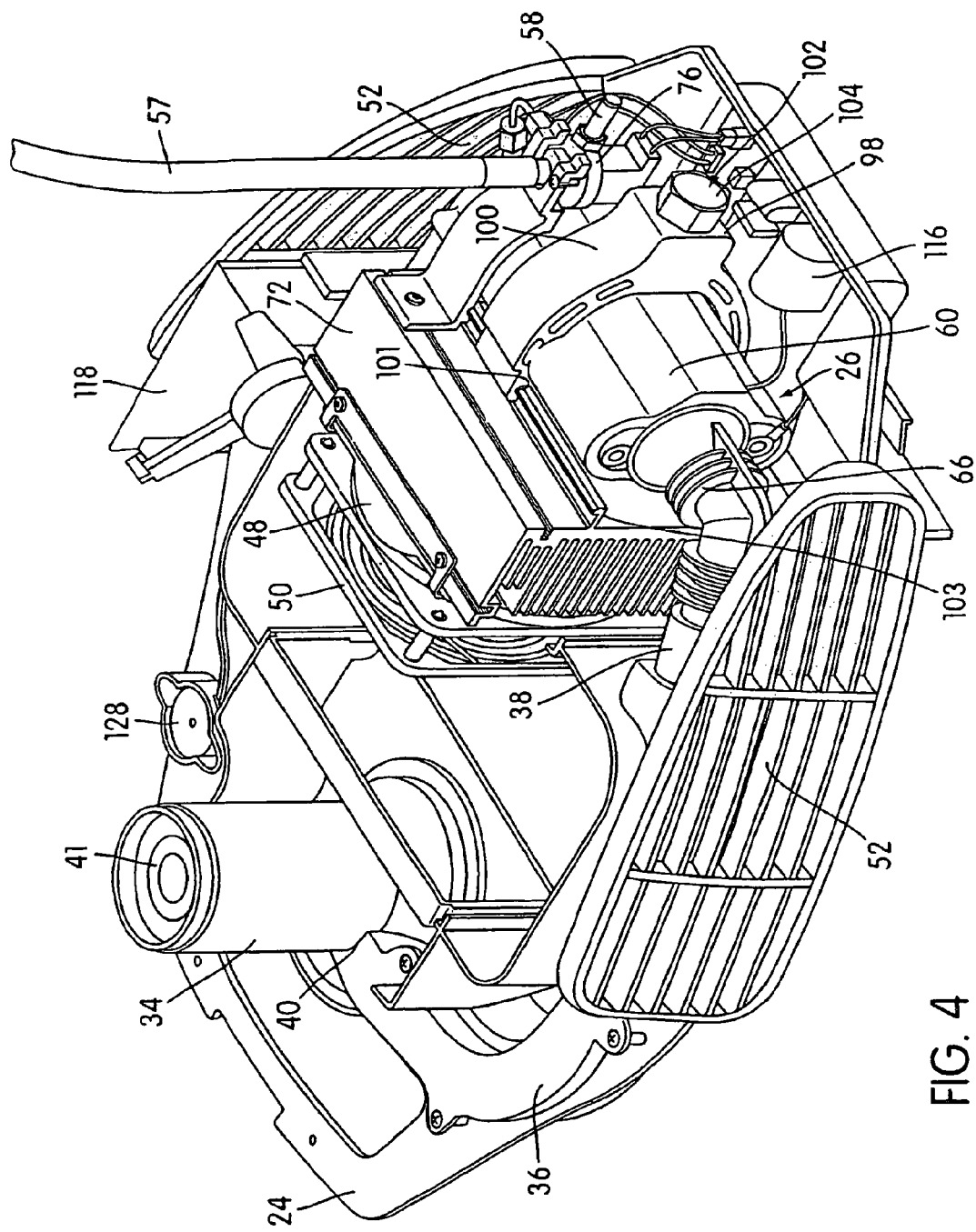
FIG. 4 is an enlarged perspective view illustrating the combustion assembly and sub-housing of the flying insect trapping device shown in FIG. 3.

As shown in FIGS. 2-4, a sub-housing 24 is mounted to the lower shell 22 of the housing 14. The sub-housing 24 encloses a combustion assembly 26 of the device 10 and the combustion assembly is structured to generate the supply of $CO_2$ gas and water vapor. The sub-housing 24 also provides an exhaust path from the combustion assembly to the surrounding atmosphere, an insect attractant containing structure, and airflow generators, as will be further discussed below. Further, the sub-housing 24 may include a spring-biased support member 28 that is structured to support the upper shell 18 in an open position with respect to the lower shell and sub-housing 24 mounted thereto. In the illustrated embodiment, one or more coil springs bias the support member 28 to an upwardly extending support position. The support member 28 can be pivoted downwardly adjacent the sub-housing, against the biasing of the spring(s), when the upper shell 18 is in a closed position.

Figure 8:
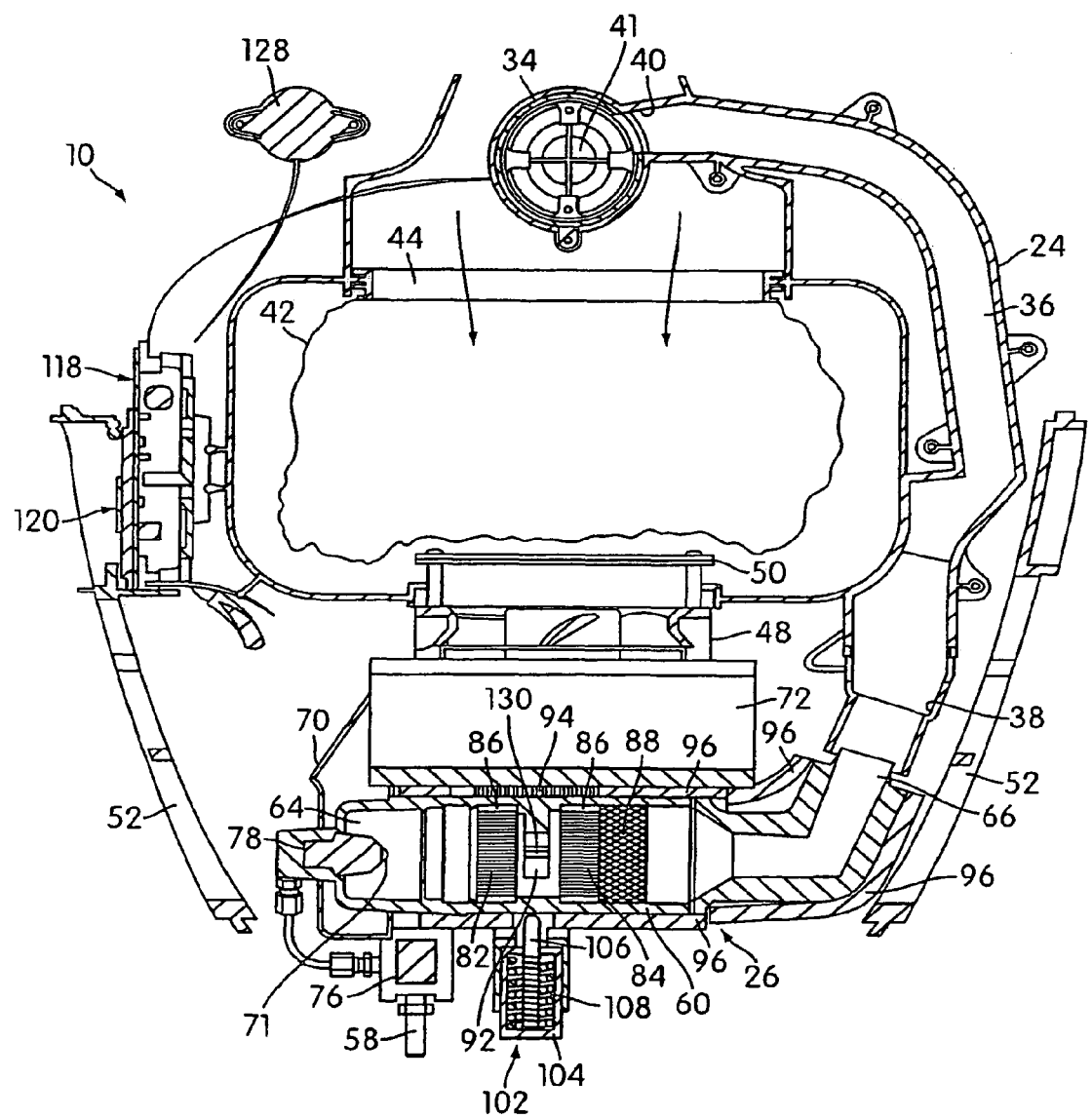
FIG. 8 is a cross-sectional view through line 8-8 of FIG. 7.

As illustrated, the sub-housing 24 includes an outlet nozzle 34 that is concentrically mounted within the intake nozzle 30. The outlet nozzle 34 has an elongated tube 35, which is attached by fasteners or snap-fitting to, and thus forms a part of, the outlet nozzle 34. The elongated tube 35 of the outlet nozzle 34 provides an exhaust outlet opening on the lower end thereof that opens to the surrounding atmosphere. More specifically, as best shown in FIG. 8, the sub-housing 24 includes a conduit 36 having an inlet 38 and an outlet 40. The inlet 40 is communicated with an outlet of the combustion assembly 26, and the outlet 40 is communicated with the outlet nozzle 34 and exhaust outlet opening thereof. An exhaust fan 41 is positioned at the lower end of the outlet nozzle 34 to urge the combustion gases of the combustion assembly 26 to pass through the outlet nozzle 34. That is, the exhaust fan 41 produces negative pressure which draws combustion gases from the combustion assembly 26 and forces it out the outlet nozzle 34. As a result, exhaust from the combustion assembly 26 flows from the combustion assembly 26, through the conduit 36, and out the exhaust outlet nozzle 34 to the surrounding atmosphere. The exhaust fan 41 is powered by electricity delivered from a controller, as will be further discussed below.

The outlet nozzle 34 and its exhaust outlet opening allows a "plume" of exhaust gas comprising carbon dioxide, water vapor, and an optional chemical insect attractant to flow outwardly and downwardly therefrom. As the downward flow of the exhaust gas reaches the ground, it flows radially outwardly from the device 10 along the ground. Mosquitoes and other insects attracted to the carbon dioxide, water vapor, and insect attractant will be able to sense this radiated plume of carbon dioxide, water vapor, and insect attractant and follow the same to its source, namely the exhaust outlet opening.

As can be appreciated from the construction disclosed, because the outlet nozzle 34 is concentric with the intake nozzle 30, the attracted insects will follow the insect attractant to its source (i.e., the outlet opening) and thus they will be immediately adjacent the insect inlet upon reaching the outlet opening. As a result, the attracted insects will be "vacuumed" by the inflow into the intake nozzle 30 whereby they are drawn into the device 10 and captured therein. The respective flows of the vacuum intake and the exhaust gas outflow are indicated by the inflow and outflow arrows in FIG. 8, and are referred to as "counterflow." For further details and variations on this aspect of the disclosed construction, reference may be made to the above-incorporated '243 patent and '005 patent. Also, reference may be made to U.S. Pat. No. 6,286,249, filed Sep. 17, 1996, the entirety of which is hereby incorporated into the present application by reference. Further, outlet nozzle 34 and its outlet opening may be carried on the frame in any suitable manner and the construction illustrated and described is only an exemplary construction. For example, multiple outlet openings and/or openings with other locations, shapes or orientations may be used.

As shown in FIG. 8, a mesh bag 42, the interior of which defines an insect trap chamber, is removably mounted to the sub-housing 24 adjacent the intake nozzle 30. The chamber defined by the bag 42 is communicated to the inlet opening so that the insects drawn in by the vacuum will be deposited in the bag whereat they will become dehydrated and perish. Alternatively, the material of the bag may be treated with a poison for purposes of facilitating the insect termination function; however, that is not a necessary feature of the invention. The mesh bag 42 may include a rigid frame portion 44 (shown as a mouth) that is removably attachable to the sub-housing for mounting the mesh bag 42 to the sub-housing 24.

As shown in FIG. 2, the sub-housing 24 includes an access door 46 that can be pivotally moved between open and closed positions. The access door 24 permits access into the interior of the sub-housing 24 to allow the user to access the mesh bag 42 as desired for purposes of removal/replacement. Also, as another alternative, a plastic box or any other suitable structure may be used in place of the mesh bag. In the illustrated embodiment, the access door 46 may be formed from a transparent material to enable the user to visually inspect the mesh bag 42 to determine whether it needs removal/replacement. Specifically, a door made of transparent material would enable the user to visually verify whether the bag 42 is at or near its full capacity of insects. Also, the upper shell 18 of the housing 14 may include a transparent portion 20 that would enable the user to visually inspect the bag 42 without opening either of the upper shell 18 of the housing 14 or the access door 46 of the sub-housing 24.

As shown in FIG. 8, air flows into inlet opening and through intake nozzle 30 causing any flying insects which may be located in the surrounding atmosphere proximate to the inlet opening to be drawn into and deposited into the bag 42 which is communicated with the inlet opening via intake nozzle 30. The vacuum that causes the inflow of air into the device 10 is created by an electrically-powered fan 48 which is placed downstream of the bag 42. The fan 48 is powered by electricity delivered from a controller, as will be further discussed below. The fan 48 is configured to draw air from the upstream direction, e.g., through the inlet opening, then through the intake nozzle 30 and then through the mesh bag 42, to produce a vacuum which is capable of drawing insects into device 10. The ambient air which is drawn through the bag 42 by the fan 48 is then sent downstream past the fan to cool the combustion assembly 26. The fan 48 includes a grid barrier or baffle 50 which is provided to prevent the mesh bag 42 from contacting the fan 48. Additionally, one or more filters 52 are provided in the housing 14 and sub-housing 24 to ensure the air that is passed over the combustion assembly 26 is exhausted out of the device 10. The filters 52 are constructed of a metallic mesh fabric, however, more broadly, any suitable filtering method would be acceptable.

An insect attractant that includes $CO_2$ gas and water vapor is generated by burning propane, or any other suitable hydrocarbon fuel, in the combustion assembly 26 provided within the housing 14.

The lower shell 22 of the housing includes a series of integrally molded ribs defining a relatively flat area for mounting the combustion assembly 26. The lower shell 22 also includes a pair of openings 54, 56. Opening 54 is provided for allowing a regulator hose 57 to be inserted therein and connected to the combustion assembly 26 for purposes of supplying combustible fuel, preferably propane, thereto. Opening 56 is provided for allowing a valve assembly 58 to be inserted therein and connected to the combustion assembly 26 for purposes of expelling combustible fuel from the combustion chamber of the combustion assembly 26, as will be discussed below.

Figure 9:
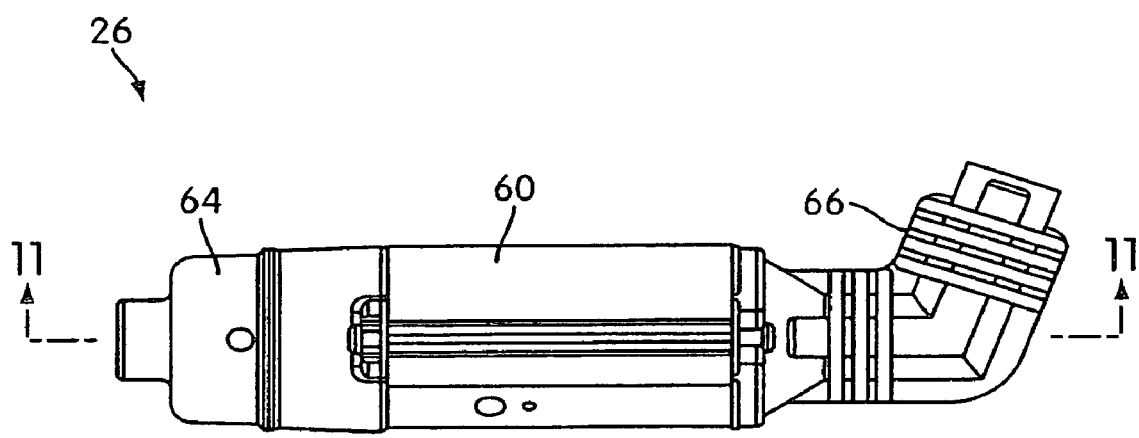
FIG. 9 is a side view of the combustion assembly of the flying insect trapping device shown in FIG. 1.
Figure 10:
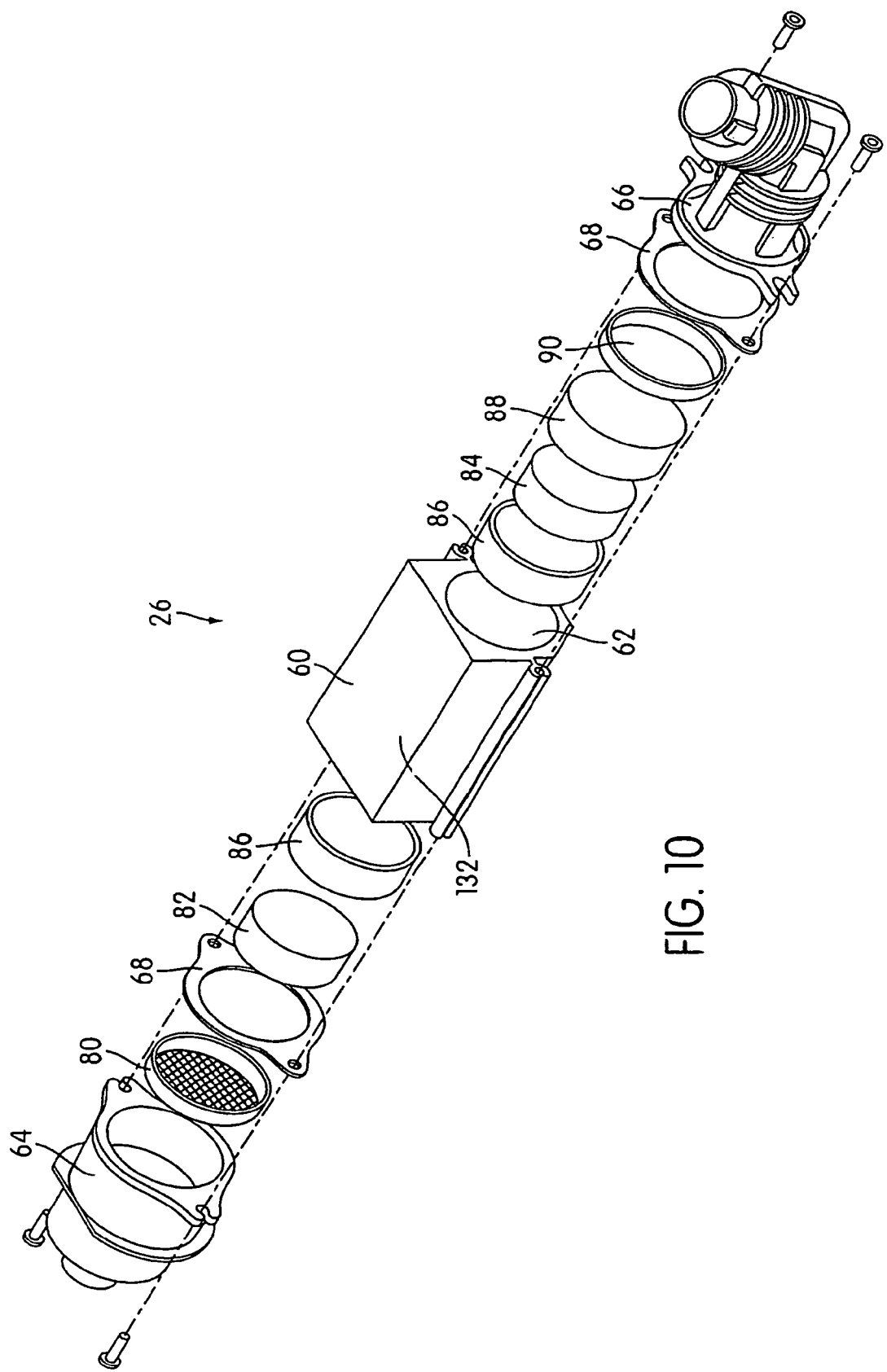
FIG. 10 is an exploded view of the combustion assembly shown in FIG. 9.
Figure 11:
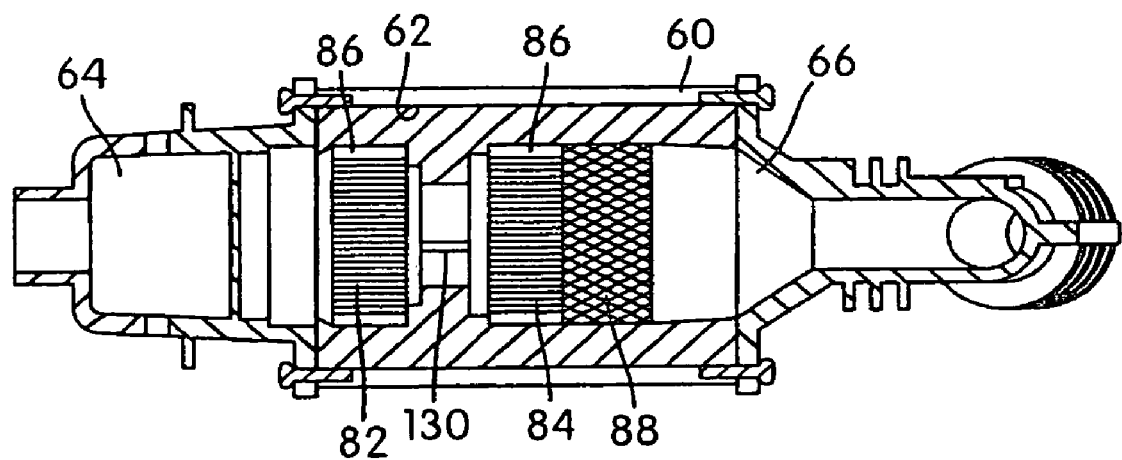
FIG. 11 is a cross-sectional view through line 11-11 of FIG. 9.

As best shown in FIGS. 9-11, the combustion assembly 26 includes a combustion chamber portion 60 that provides a generally cylindrical combustion chamber 62. The combustion chamber portion 60 is at least partially formed from a heat conductive material, such as aluminum, copper, steel or any other metal. It is contemplated that a portion of the combustion chamber portion 60 may be formed from a ceramic, or any other heat resistant insulating material, as will be discussed in further detail below.

An inlet chamber 64 is mounted to one end of the combustion chamber portion 60, e.g., by fasteners, and an exhaust chamber 66 is mounted to the opposite end of the combustion chamber portion 60, e.g., by fasteners. Insulators 68, e.g., gaskets, are mounted between the combustion chamber portion 60 and each of the inlet and exhaust chambers 64, 66.

The inlet chamber 64 has an inlet that is communicated with a source of air and a source of propane so as to provide an air/propane mixture to the combustion chamber 62 of the combustion chamber portion 60.

Figure 12:
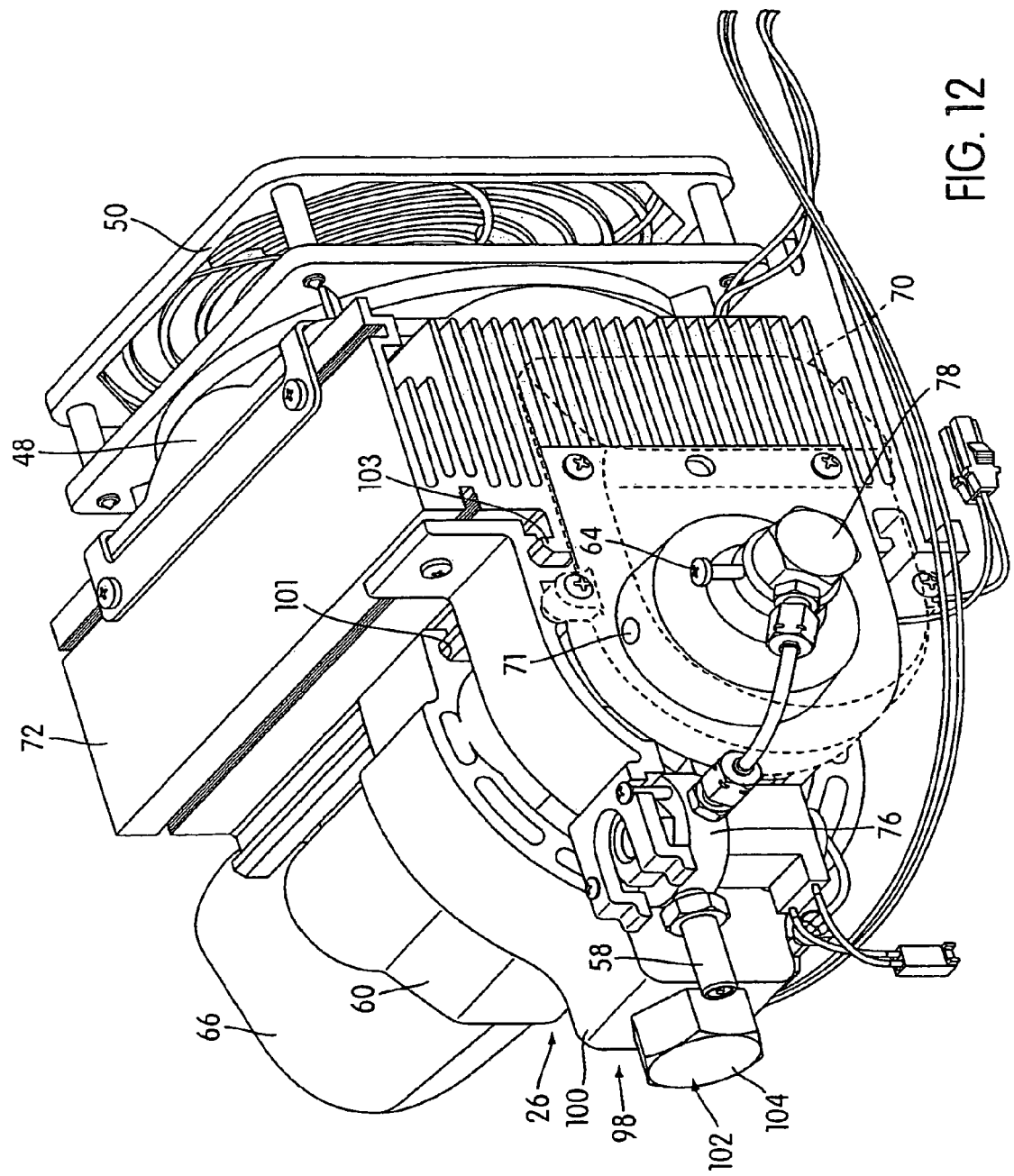
FIG. 12 is an enlarged perspective view of the combustion assembly, heat sink, and intake fan of the flying insect trapping device shown in FIG. 1.

Specifically, as shown in FIG. 8, an air supply portion 70, in the form of an air duct, extends between the inlet chamber 64 and a side of the heat sink 72. Air from the downstream side of the fan 48 enters the air supply portion 70 through an opening adjacent the heat sink 72, and the air is delivered to the inlet chamber 64 where it mixes with fuel supplied by a fuel nozzle connected to the inlet chamber 64. As shown in FIGS. 8 and 12, air enters the inlet chamber 64 through one or more openings 71, e.g., two openings, provided in the inlet chamber 64. As a result of this arrangement, air can be delivered to the combustion chamber 62 by forcing air by the fan 48 through the inlet chamber 64 via the air supply portion 70.

A fuel nozzle 78 is received in the inlet chamber 64. The nozzle 78 may be of a conventional type and may have a spray angle of approximately 45 degrees. The nozzle 78 is communicated to a solenoid manifold 76. An end of the regulator hose 57 of a propane source regulator 74 associated with the fuel supply (i.e., propane tank) connects to the solenoid manifold 76 and the manifold establishes fluid communication between the fuel supply and the nozzle 78, thereby providing for delivery of the combustible fuel to the nozzle 78 and hence the combustion chamber 62. The combustible fuel mixes with air delivered by the air supply portion 70 and the mixture is delivered via the inlet chamber 64 to the combustion chamber 62.

A solenoid valve of the solenoid manifold 76 moves between an open position for enabling the fuel to flow through the manifold for delivery to the nozzle 78 and a closed position for preventing the fuel from flowing through the manifold, and thus preventing it from flowing to the nozzle 78. The solenoid valve may include a spring biasing the valve towards its closed position. The solenoid manifold 76 and solenoid valve thereof is electrically communicated to a controller and the controller can transmit electrical signals to energize the solenoid valve and move it between its open and closed positions. Under certain operating conditions, as dictated by a control scheme, the controller can interrupt the aforementioned electrical signal in order to cause the spring to move the valve to its closed position for the purpose of preventing further fuel flow to the nozzle 78 and the combustion chamber 62.

Although, as described above, the solenoid manifold 76 provides a continuous flow of fuel to the combustion chamber, the solenoid may also be configured to provide a pulsed (intermittent) flow of fuel during operation. Further details of a pulsing solenoid are disclosed in U.S. Pat. application Publication No. 2004/0237382, the entirety of which is hereby incorporated by reference.

Additionally, a valve assembly 58 comprising a tube and a valve may be operatively connected to the solenoid manifold 76 for purposes of flushing or expelling combustible fuel from the combustion chamber of the combustion assembly 26 with pressurized air. The valve assembly 58 may also enable flushing of the fuel delivery apparatus, including the solenoid manifold and the nozzle, by a fluid such as a gas or a liquid. Further details of the valve assembly 58 are disclosed in U.S. Pat. No. 6,817,140, the entirety of which is hereby incorporated by reference. The use of the solenoid manifold 76 and the release valve assembly 58 is a preferred feature and should not be considered limiting.

As best shown in FIGS. 10 and 11, a relatively thin diffuser plate 80 is mounted within the combustion chamber 62 adjacent the inlet chamber 64. The diffuser plate 80 has a plurality of apertures therethrough. An uncoated, catalytically inactive monolith 82 is positioned within the combustion chamber 62 downstream from the diffuser plate 80. The monolith 82 has a series of elongated essentially linear conduits formed through the length thereof, e.g., 100 cells. A platinum coated, catalytically active monolith 84 is positioned within the combustion chamber 62 downstream from the uncoated monolith 82 in spaced relation therefrom. The monolith 84 also has a series of elongated essentially linear conduits formed through the length thereof, e.g., 100 cells. An insulating material 86 may be positioned radially between both the monoliths 82, 84 and the interior surface of the combustion chamber 62. Finally, another catalyst element 88, e.g., one or more additional catalytically active monoliths, a plurality of platinum coated catalyst beads, or any combination thereof, may be positioned within the combustion chamber 62 adjacent the monolith 84. It is also contemplated that a single catalytically active monolith 84 may be used in place of a series of monoliths and/or the catalyst beads. It has been determined that utilizing a catalytically active monolith 84 rather than catalyst beads may increase the life of the catalyst, as the conduits through the monolith 84 help to distribute the flow of the exhaust gas more evenly over the catalyst. A flat screen 90 is positioned between the catalyst element 88 and the exhaust chamber 66.

The wall of the combustion chamber portion 60 has an igniter receiving hole formed therethrough and positioned between the monoliths 82, 84. An igniter 92 can be inserted through the hole and positioned in between the monoliths 82, 84. The igniter is powered by electricity delivered from a controller and creates a spark that ignites a fuel/air mixture flowing between the monoliths 82, 84. During operation, as the fuel/air mixture continues to flow through the monoliths 82, 84, the fuel/air mixture will be continuously combusted. This region is referred to as the combustion point, or heat zone 134, and is shown in greater detail in FIG. 14 and is further discussed below. The heat zone 134 is located downstream of the monolith 82, and has a hollow interior. That is, there are no removable elements, e.g. catalyst beads, monoliths, etc., within the interior of the heat zone 134. During combustion, the catalytically active monolith 84, and optional catalyst element 88 help to convert any carbon monoxide in the resulting exhaust gas to carbon dioxide. This conversion may occur within the catalyst element 88 or may occur before the catalyst element 88, e.g. in the monolith 84.

Figure 13:
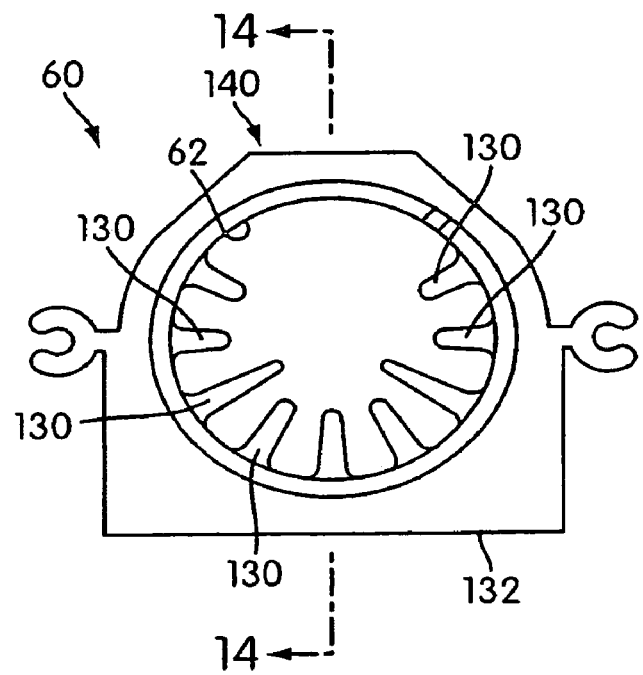
FIG. 13 is an end view of a combustion chamber portion of the combustion assembly of FIG. 10.
Figure 14:
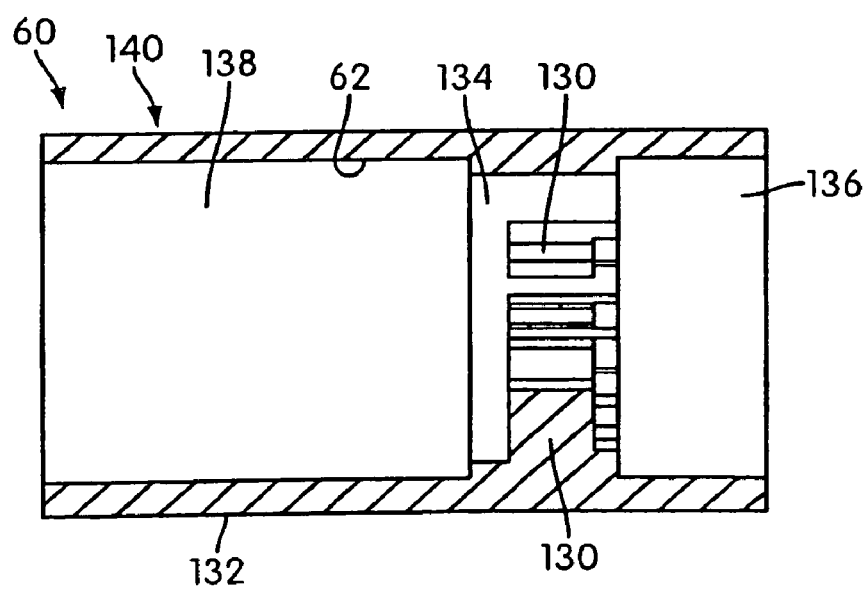
FIG. 14 is a cross-sectional view of the combustion chamber portion of FIG. 13 taken along line XIV-XIV.

As best shown in FIGS. 13 and 14, a plurality of heat exchanger fins 130 extend radially inwardly into the interior space of the combustion chamber 62 in the heat zone 134. The fins 130 are configured to conduct heat generated by the continuous combustion away from the interior space of the heat zone 134 of the combustion chamber 62. The fins 130 are preferably made of a high heat conducting material, such as aluminum, copper, or any other suitable material. The fins 130 are arranged to conduct the heat generated by the continuous combustion to a back side 132 of the combustion chamber portion 60. The back side 132 of the combustion chamber portion 60 is preferably a substantially flat, smooth surface. It has been found that the configuration and arrangement of the fins 130 allow more heat to be extracted from the interior of the combustion chamber 62, as compared to a configuration without the fins 130, while minimizing disruption of the flow of the exhaust gas flowing through the combustion chamber 62, as well as the pressure drop across the heat zone 134, as will be discussed in further detail below. It is contemplated that a top portion 140 of the combustion chamber portion 60 that is located opposite the fins 130 may be fabricated out of a ceramic material to further direct the heat towards the back side 132 of the combustion chamber portion 60.

As shown in FIG. 14, the combustion chamber 62 may include a plurality of zones, including the heat zone 134, a laminating zone 136 and a catalyst zone 138. The monolith 82 may be placed in the laminating zone 136, and the catalytically active monolith 84 may be placed in the catalyst zone 138 so that the heat zone 134 is bound by the laminating monolith 82 and the catalytically active monolith 84. It has been found by the inventors that by controlling the volume of the fins 130 relative to the volume of the heat zone 134, the disruption of the flow of the exhaust gas and pressure drop within the combustion chamber 62 may be minimized, while a significant amount of additional heat may be extracted from the heat zone 134, and, hence, combustion chamber 62. Preferable range of ratios of the volume of the fins 130 to the volume of the heat zone 134 is about 0.05 to about 0.15, more preferably about 0.09 to about 0.13, and most preferably about 0.11. In a particular embodiment that utilizes a ratio of 0.11, it is expected that the temperature of the back side surface 132 of the combustion chamber 62 may be increased to a temperature between about 325° F. to about 375° F. without substantially affecting the flow of the exhaust has through the heat zone 134, and experiments have shown that the back side surface 132 may be sustained over several hours at a temperature of about 350° F. This example is not intended to be limiting in any way.

The combustion operation occurs as follows. The fuel (i.e., propane) is sprayed by the nozzle 78 into the upstream end of the combustion chamber 62 and air is also forced into the upstream end of the combustion chamber 62 via the air supply portion 70 for mixture with the fuel. This creates a turbulent mixture of fuel and air. At this point, turbulence is desirable to ensure that the fuel and air mix together thoroughly. However, turbulence is undesirable at the combustion point. Thus, the diffuser plate 80 functions to disperse the fuel into the air and to initially reduce the turbulence, and therefore initially "straightens" the flow. Specifically, as the mixture flows downstream through the apertures formed through the plate 80, the apertures function to "align" the mixture flow in the downstream direction and reduce the turbulence thereof, thus making the flow somewhat more laminar. As the mixture continues to flow downstream, it enters the conduits of the monolith 82 that is disposed within the laminating zone 136. The elongated, essentially linear configuration of these conduits eliminates essentially all the turbulence and provides an essentially laminar flow of fuel/air mixture to the heat zone 134, or combustion point. Because the fuel and air have been thoroughly mixed upstream while in a highly turbulent state, the mixture delivered by the monolith 82 to the combustion point is essentially homogenous. A homogenous and laminar mixture flow is desirable for ensuring that all the fuel is burned during combustion. Specifically, a homogenous flow provides for even combustion of all the fuel and air present at the combustion point and laminar flow prevents "pockets" of unburned fuel from passing through with exhaust gas, as may happen if the mixture were highly turbulent during combustion, thereby increasing the efficiency of the fuel. This is desirable to avoid the presence of fuel in the ultimate exhaust gas, as the presence of fuel is believed to be ineffective at attracting flying insects, and in fact may be a repellent.

The air-fuel mixture is burned by combustion to create a heated exhaust gas. This exhaust gas includes, among other things, carbon dioxide and some carbon monoxide. As the exhaust gas flows through the catalytically active monolith 84, and optional catalyst element 88 in the catalyst zone 138, the catalytically active material causes a reaction to occur whereby the carbon monoxide present in the gas is converted to carbon dioxide. A by-product of this reaction, commonly referred to as catalytic conversion, is also the creation of water (in vaporized form) in the exhaust gas. The manner in which this reaction occurs is well known and need not be described in further detail. The reason for providing this reaction is to eliminate, as much as possible, the presence of carbon monoxide in the exhaust gas, as it is known that carbon monoxide is a repellent to mosquitoes and other flying insects. The presence of water in the exhaust gas is an advantageous, although not necessary, result of the catalytic conversion reaction because the resulting exhaust gas will better mimic the exhalation of a mammal, which is typically moist due to presence of water.

The combustion gases, including $CO_2$ and water vapor, are brought to the inlet 38 of the sub-housing conduit 36 through the exhaust chamber 66. The exhaust fan 41 draws the combustion gases through the conduit 36 towards the outlet nozzle 34. Also, the exhaust fan 41 draws air downstream from the fan 48 into the conduit 36 through openings provided between the conduit 36 and exhaust chamber 66. This air mixes with the combustion gases and the fan 41 urges the mixture to pass through the outlet nozzle 34.

The inventors have also found that embodiments of the insect trapping device 10 may provide a gas that exits the trapping device 10 with between about 5,000 ppm and about 15,000 ppm $CO_2$, and more typically between about 9,500 ppm and 13,500 ppm, which is double and even triple the output of $CO_2$ of many of the prior art devices. Of course, such amounts should not be considered to be limiting an any way and are merely provided as an example of the improved efficiency of the trapping device 10.

The inventors have also found that by providing the combustion assembly 26 of the type described above, the orifice of the fuel nozzle 78 may be increased, due to the reduced pressure drop created within the combustion device 26. Such an increase may improve the reliability of the nozzle 78, as contaminants in the combustible fuel may impede the flow of the fuel through the nozzle 78, or even clog the nozzle 78. For example, many trapping devices of the prior art have fuel nozzles with orifice diameters of about 0.0045" to about 0.006", due to the high pressure drop created within those devices. By providing a more efficient combustion assembly 26 of the design disclosed herein, it has been found that the orifice may be increased to about 0.010" and greater, e.g. to about 0.050". In one embodiment, the orifice diameter has been increased to about 0.013". In another embodiment, the orifice diameter has been increased to about 0.033". These diameters should not be considered to be limiting in any way.

As shown in FIG. 8, a thermoelectric generator includes a thermoelectric (TE) module 94 (with graphoil on both sides). The thermoelectric generator may include a single TE module or an array of TE modules, e.g., TE modules arranged in series. The TE module 94 is mounted between the back side 132 of the combustion chamber portion 60 and an extruded aluminum heat sink 72. The output voltage of the TE module 94 is used to power the controller which controls operation of the components of the device, i.e., intake fan 48 and exhaust fan 41. The voltage and current generated are a direct function of the number of junctions, the difference in temperature from a hot side of the module 94 adjacent to the combustion chamber portion 60 (as discussed above, several heat exchanging fins 130 extend into the combustion chamber 62 to conduct additional heat to the back side 132 of the combustion chamber portion 60) to a cold side adjacent to the heat sink 72 (fan 48 blows a flow of air onto the heat sink 72 to cool it), and the heat flux though the module 94. The combustion chamber portion is also surrounded with insulation 96 to increase the temperature gradient. Further details of how a TE module operates is disclosed in the '243 patent.

As discussed, above, the addition of the heat exchanger fins 130 has been found to increase the amount of heat that may be extracted from the combustion chamber portion 60, thereby increasing the temperature at the back side surface 132 of the combustion chamber portion 60. This in turn increases the temperature at the hot side of the module 94, which increases the output of the module 94, when keeping all other variables described above constant. Preferably, the temperature differential between the hot side and the cold side of the module 94 is about 170° F. to about 250° F. Testing of embodiments of the trapping device 10 of the present invention has found the temperature differential to be about 230° F. Of course, further improvements may be made to optimize the temperature at the cold side, thereby further improving the temperature differential. The above example is not intended to be limiting in any way.

As best shown in FIGS. 4 and 8, the TE module 94 is clamped between the combustion chamber portion 60 and the heat sink 72 by a clamping device 98. The clamping device 98 aligns the combustion chamber portion 60, heat sink 72, and TE module 94 with one another. The alignment between components facilitates distribution of the clamping load over the TE module 94. The distribution of the load prevents damage to the TE module 94 and maintains a good interface between the backside 132 of the combustion chamber portion 60, the TE module 94, and the heat sink 72.

Figure 7:
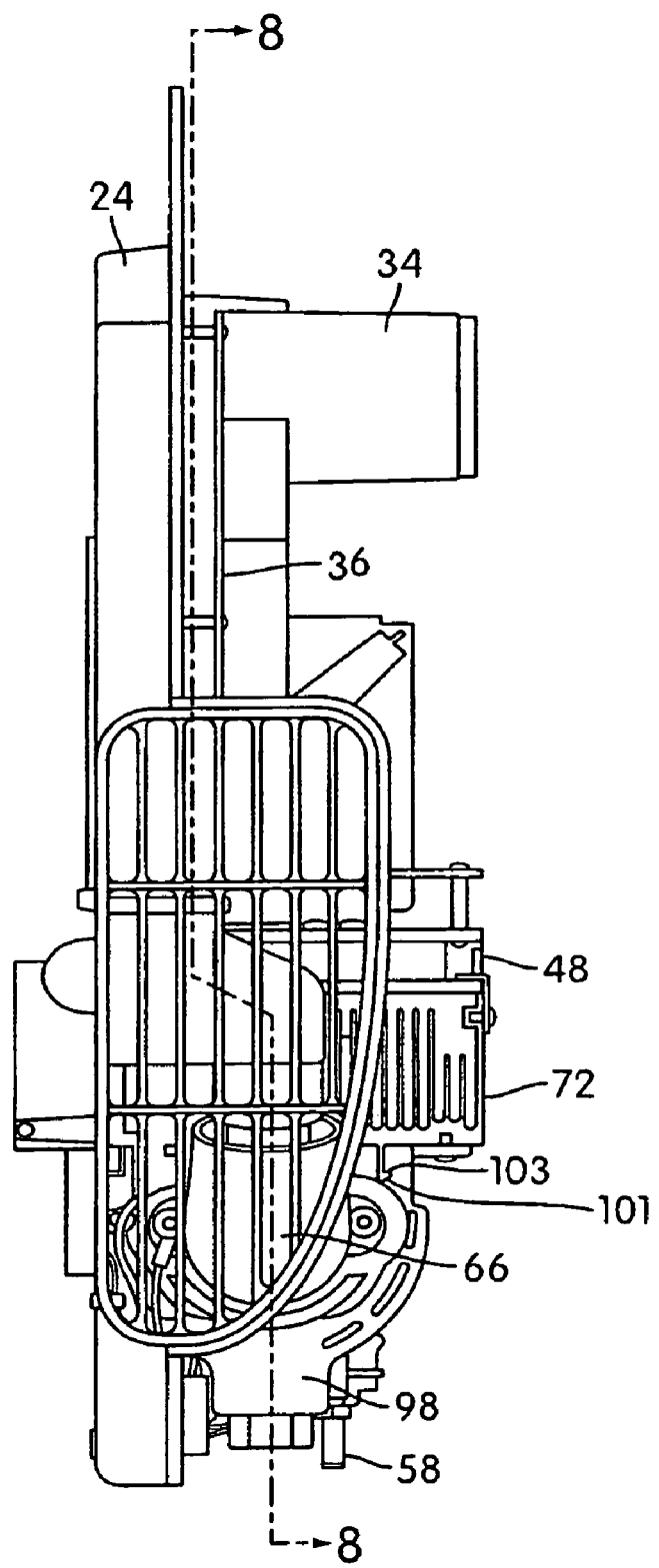
FIG. 7 is a side view of the combustion assembly and sub-housing of the flying insect trapping device shown in FIG. 4.

The clamping device 98 includes a generally C-shaped aluminum bar 100. The bar 100 has arms that attach to the heat sink 72 such that the bar 100 encircles the combustion chamber portion 60 and TE module 94. As shown in FIGS. 4 and 7, the arms of the bar 100 each include recesses 101 that interlock with protrusions 103 provided on the heat sink 72. This arrangement allows sliding movement of the bar 100 along the heat sink 72 to allow proper alignment of the bar 100 with the combustion chamber portion 60 and TE module 94. However, the bar 100 may be connected to the heat sink 72 in any other suitable manner.

The clamping device 98 also includes a spring-biased pin assembly 102, which provides a single point of contact on the combustion chamber portion 60. It has been found that by applying a single point of contact to the combustion portion 60 that is substantially aligned with the center of the TE module 94, the heat being conducted from the combustion chamber portion 60 may be substantially evenly distributed across the TE module 94. The pin assembly 102 is attached to the bar 100 and operatively engaged with the combustion chamber portion 60 so as to the bias the combustion chamber portion 60 towards the heat sink 72. This arrangement clamps the TE module 94 between the combustion chamber portion 60 and the heat sink 72. The biasing force exerted by the pin assembly 102 may be adjusted so as to adjust the load being exerted to the TE module 94. Specifically, the pin assembly 102 includes a fastener 104, a pin 106, and a spring 108. The fastener 104 is threadably engaged with the bar 100. The pin 106 is biased away from the fastener 104, and into the combustion chamber portion 60, by spring 108. The fastener 104 can be suitably adjusted to adjust the biasing force being exerted by the pin 106 onto the combustion chamber portion 60.

As shown in FIG. 2, a supplemental insect attractant element is mounted in an upper end of the outlet nozzle 34. The insect attractant element includes a housing 110 and a cap 112. The cap 112 has locking elements for releasably securing it to the sub-housing 24. The attractant used inside the housing 110 may be octenol or any other material that mimics a mammalian smell that will assist in attracting mosquitoes and other flying insects. The housing 110 has one or more openings for enabling the attractant to mix with the exhaust gas and become part of the exhaust flow. In the illustrated embodiment, the housing 110 has protrusions 114 that releasably attach the housing 110 to the sub-housing 24. When the user desires, the attractant can be removed and replaced as needed by removing the cap 112 to access the housing 110.

As noted above, a controller, powered by the TE module 94, controls operation of the device 10. In the illustrated embodiment, the controller includes first and second circuit boards 116, 118 that are electrically connected with one another. The first circuit board 116 is positioned on a rear of the sub-housing 24 and the second circuit board 118 is positioned on a side of the sub-housing 24. However, it should be understood that the controller may be constituted by a single circuit board or a plurality of circuit boards.

The components of the device 10 are electrically connected to the circuit boards 116, 118. This enables the controller to control and monitor these components. Moreover, the controller may be manipulated by the user to selectively control the components.

In the illustrated embodiment, the solenoid 76, igniter 92, and TE module 94 (all positioned toward a rear of the sub-housing 24) are communicated to the first circuit board 116 of the controller. The exhaust fan 41, the intake fan 48, and an LED display 120 are communicated to the second circuit board 118.

The circuit boards are primarily powered by the TE module 94. Also, a battery 122 is coupled to the second circuit board 118 and an array of solar power panels 124 provided on the upper shell 18 of the housing 14 is coupled to the first circuit board 116. The battery 122 and solar power panels 124 provide alternative power supplies to the controller. However, the controller may be powered by any other suitable method, e.g., a standard electrical plug. As illustrated, the battery 122 is secured within a compartment provided on the sub-housing 24. The compartment has a pivotably movable lid that can be secured in a closed position, e.g., with a snap fit.

When the flying insect trapping device 10 is turned on, the controller can turn on the fans 41, 48 and perform a diagnostic check on the fans 41, 48. If the diagnostic check of the fans 41, 48 fails or the fans 41, 48 fail to turn on, the controller can stop the device and provide an indication to the user, via the LED display 120, that there was an error with the fans 41, 48. Once the fans 41, 48 are on and the diagnostic tests for the fans 41, 48 have been passed, the controller can open the solenoid 76, turn on the igniter 92, and perform a diagnostic test of the rest of the device. The diagnostic test of the rest of the device includes, for example, testing the igniter 92, the solenoid 76, etc. Again, if the diagnostic test at fails, the controller can provide an indication to the user via the LED display 120 as to which test failed.

The controller can also check the temperature of the system. If the temperature is between predetermined magnitudes, the system can continue to operate normally. Otherwise, the system can perform a temperature maintenance process.

The device 10 has a manually operable on/off switch, e.g., push-button switch 126, mounted adjacent the LED display 120. The switch 126 is communicated to the controller and can be selectively pushed or otherwise actuated by the user to activate the controller to turn the device on and off. The LED display 120 can indicate if the device is on/off, as wells as fan operation, temperature, etc.

Also, an audible chime 128 may be coupled to the controller and alarm the user of malfunction, etc.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A device using a combustible fuel as a fuel source, the device comprising:
    a supporting frame;
    a combustion chamber mounted on said supporting frame and including,
        an inlet port for receiving the combustible fuel;
        a heat zone downstream of said inlet port and having a hollow interior space to enable the combustible fuel to flow into the heat zone for continuous combustion therein;
    a catalyst element disposed downstream of said heat zone to create a carbon dioxide exhaust gas; and
    a heat exchanger element extending inwardly into the hollow interior space of the heat zone for conducting heat generated by the continuous combustion;
    an exhaust outlet for the carbon dioxide exhaust gas to flow outwardly therethrough to the environment;
    a heat sink configured to dissipate heat; and
    a thermoelectric element for generating electric current as heat transfers from a first side thereof to a second side thereof, the thermoelectric element having the first side disposed in contact with the combustion chamber and the second side disposed in contact with the heat sink to enable heat generated by the continuous combustion to be transferred to the heat sink via the thermoelectric element to generate the electric current, the thermoelectric element being electrically coupled to at least one other component supported on said frame to at least partially power said at least one other component.

2. The device of claim 1, further comprising a controller in communication with the thermoelectric element and the at least one other component device being powered by said thermoelectric element, the controller being configured to receive the electrical current generated by the thermoelectric element and to communicate said current to the at least one other component.

3. The device of claim 2, further comprising an exhaust element in communication with the controller, the exhaust element being positioned to draw the exhaust gas from the combustion chamber and push the exhaust gas out into the environment.

4. The device of claim 1, further comprising a clamping element for pressing the combustion chamber against the thermoelectric element to substantially evenly distribute the heat being conducted from the combustion chamber engine across the first side of the thermoelectric element, wherein the clamping element is connected to the heat sink and is configured to apply a single point of contact to the combustion chamber, the single point of contact being substantially aligned with a center of the thermoelectric element.

5. The device of claim 4, wherein the clamping element comprises a C-clamp that is connected to the heat sink at each end thereof, and a plunger that is connected to the C-clamp at a central portion thereof, and applies the single point of contact to the combustion chamber at a surface opposite the heat sink.

6. The device of claim 1, wherein the catalyst element comprises a monolith with a plurality of essentially straight conduits extending therethrough, the conduits having a catalyst on a surface thereof.

7. The device of claim 1, wherein the heat exchanger element includes a metal selected from the group consisting of aluminum and copper.

8. The device of claim 7, wherein another portion of the combustion chamber that does not directly contact the heat exchanger element includes a ceramic material.

9. The device of claim 1, wherein a ratio of a volume of said heat exchanger element to a volume of said interior space of said heat zone is in a range of about 0.05 to about 0.15.

10. The device of claim 1, wherein a ratio of a volume of said heat exchanger element to a volume of said interior space of said heat zone is in a range of about 0.09 to about 0.13.

11. A device having a fuel supply containing a combustible fuel, comprising:
a combustion chamber including a heat zone having an interior space, combustion occurring in said heat zone to generate an exhaust gas that is exhausted to the environment;
a heat transfer element extending into said heat zone interior space of said combustion chamber to conduct heat generated by the combustion away from said heat zone interior space and toward a back side of said combustion chamber,
an exhaust outlet configured to receive said exhaust gas and to direct a flow of exhaust gas outwardly therethrough to said environment;
a thermoelectric module having a hot side in contact with said back side of said combustion chamber and a cold side spaced from said combustion chamber back side, said thermoelectric module generating electric current from heat transferred from said combustion chamber back side, to said thermoelectric module hot side and then to said thermoelectric module cold side; and
said electric current generated by said thermoelectric module being used to power a component of said device.

12. The device as set forth in claim 11, further comprising:
an inlet chamber mounted on one end of said combustion chamber that provides an air/propane mixture to said combustion chamber;
a diffuser plate mounted within said combustion chamber adjacent said inlet chamber, said diffuser plate having a plurality of apertures therethrough to reduce fuel flow turbulence;
a catalytically active monolith positioned in said combustion chamber downstream from said diffuser plate, said monolith having a series of elongated essentially linear conduits formed through a length thereof; and
a catalyst element positioned downstream from said monolith, the linear conduits in said monolith configured to help distribute exhaust gas flow more evenly over said catalyst element.

13. The device as set forth in claim 12, further comprising:
an uncoated catalytically inactive monolith positioned between said diffuser plate and said catalytically active monolith; and
an insulating material positioned radially between each of said two monoliths and an interior surface of said combustion chamber.

14. The device as set forth in claim 13, wherein said combustion chamber further comprises a laminating zone and a catalyst zone, said catalytically inactive monolith being located in said laminating zone and said catalytically active monolith being located in said catalyst zone, a combustion point in said heat zone being positioned between said laminating zone and said catalyst zone.

15. The device of claim 11, wherein a ratio of a volume of said heat transfer element to a volume of said interior space of said heat zone is in a range of about 0.05 to about 0.15.

16. The device of claim 11, wherein a ratio of a volume of said heat transfer element to a volume of said interior space of said heat zone is in a range of about 0.09 to about 0.13.

17. The device of claim 11, further comprising a controller in communication with the thermoelectric module and the component device being powered by said thermoelectric module, the controller being configured to receive the electrical current generated by the thermoelectric module and to communicate said current to the component being powered by said thermoelectric module.

18. The device as set forth in claim 1, wherein said heat transfer element defines a plurality of channels that minimize disruption of exhaust gas flow through said combustion chamber.

19. The device as set forth in claim 18, wherein said heat transfer element includes a plurality of fins that define said channels, said fins extending radially inwardly from an inner wall of said chamber so as to extend only partly across said interior space.

20. The device as set forth in claim 11, wherein said heat transfer element includes a plurality of fins that extend radially inwardly from an inner wall of said chamber so as to extend only partly across said interior space.

* * * * *